United States Patent Office 2,710,396
Patented June 7, 1955

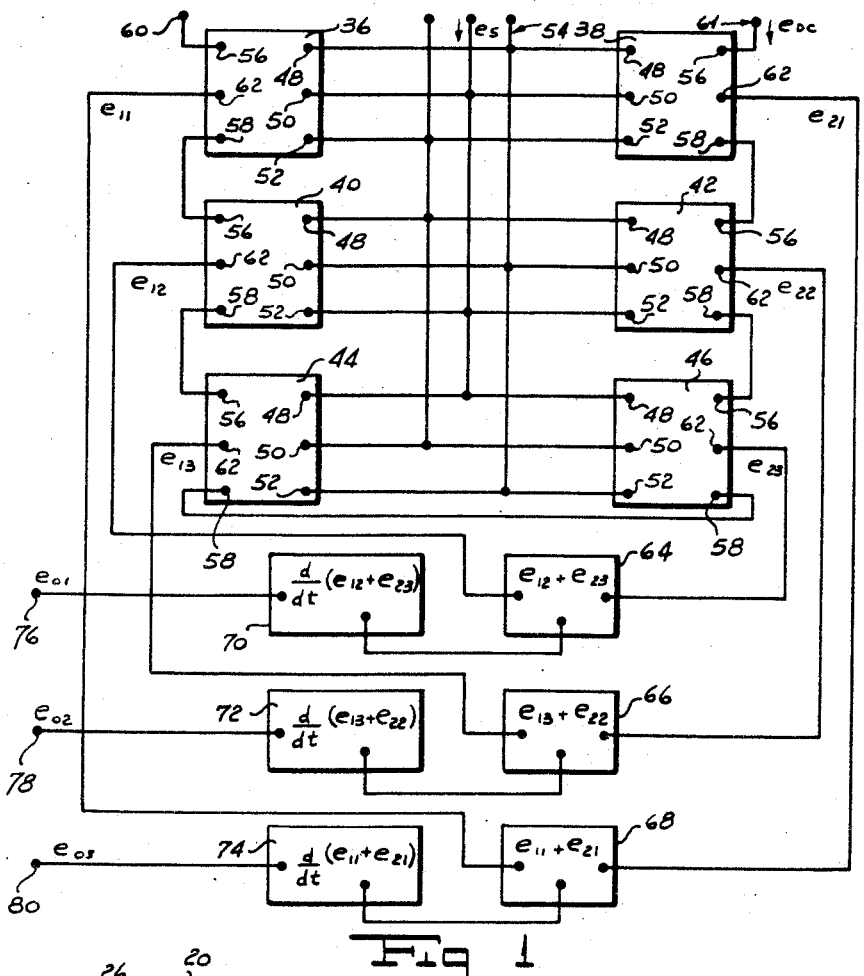
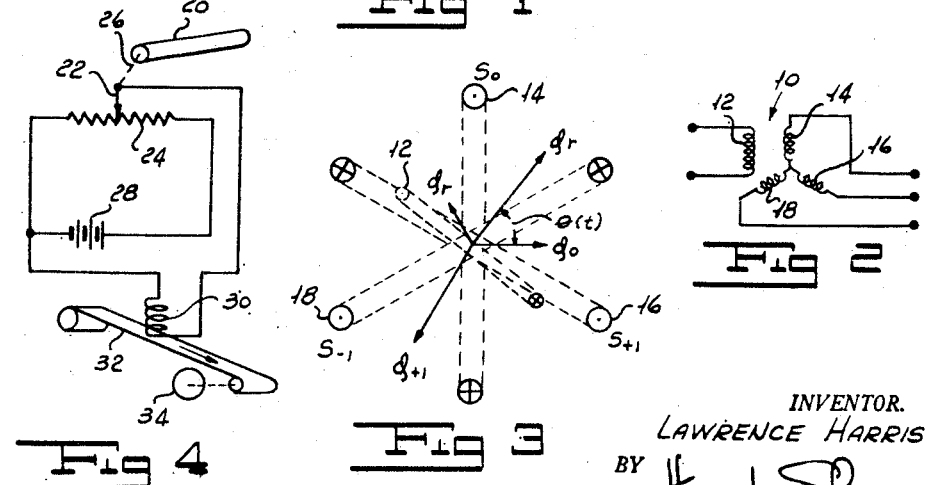

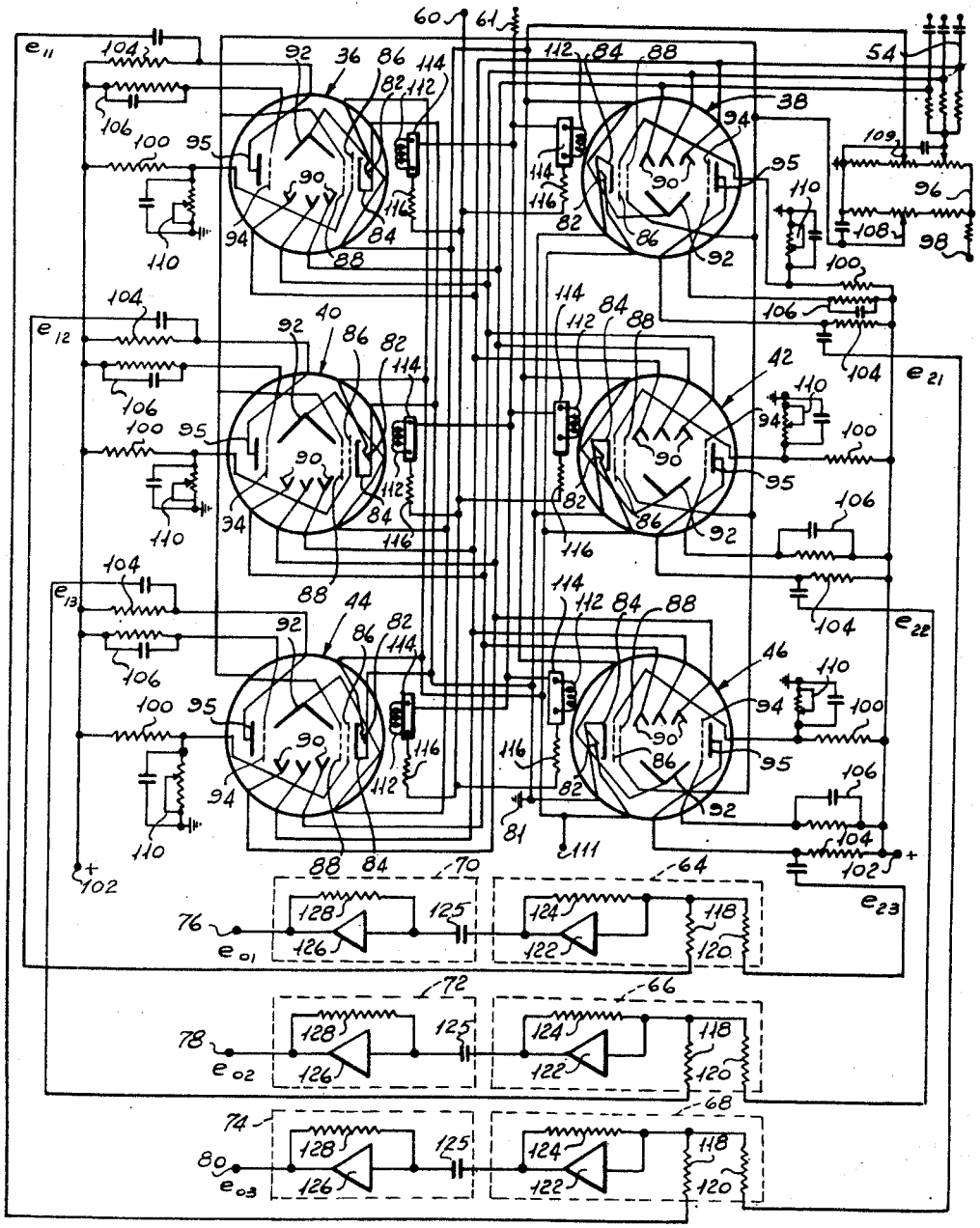
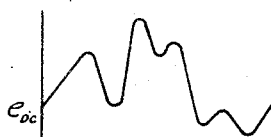
INVENTOR.
LAWRENCE HARRIS

2,710,396

METHOD AND APPARATUS FOR GENERATING SYNCHRONOUS CONTROL SIGNALS

Lawrence Harris, Brooklyn, N. Y., assignor, by mesne assignments, to Ketay Instrument Corporation, New York, N. Y., a corporation of Illinois Application April 27, 1954, Serial No. 425,975

8 Claims. (Cl. 340—345)

My invention relates to a method and apparatus for generating synchronous control signals and more particularly to such a method and apparatus as will produce synchronous control signals from a record of a motion which varies with time.

In many applications it is necessary or desirable to reproduce a motion or displacement which varies irregularly as some function of time. Such an aperiodic motion can be simultaneously reproduced at a location some distance removed from the point of origin by means of a synchro or selsyn system. However, the distance at which the motion can be reproduced is limited and synchro systems of the prior art are provided with no means for storing the motion so that it can be reproduced at a later time. Means are, however, available for recording variations in the displacement or motion such that a voltage proportional to the motion can later be produced as by a tape recorder or the like. I have invented a method whereby from such a voltage proportional to changes in the displacement it is desired to reproduce, I produce a signal which is identical with the output signal which would be produced by a synchro-transmitter if its rotor were displaced in accordance with the motion to be reprodued. When the signal produced by my method is fed into the stator of a synchro-receiver, the receiver rotor will be displaced according to the motion to be reproduced, it being understood that the rotor of the synchro is being energized by a single phase voltage of the same frequency as the signal. In addition, I have provided apparatus for carrying out my method. A particular example of the use of my method and apparatus is in the testing of servomotors designed to control the motion of an aircraft about various axes. In such an application a record of the displacement of the aircraft about one of its axes, such as the pitch axis, can be obtained from which a voltage proportional to the displacement could later be produced. With this record and the resultant voltage I can, with my method, produce a synchronous control signal from which the motion of the aircraft about its pitch axis can be reproduced at a point far removed in time and space from the point at which it initially occurred.

One object of my invention is to provide a method for generating synchronous control signals by means of which a predetermined motion may be produced and reproduced at will.

Another object of my invention is to provide apparatus wherein synchronous control signals are generated which may be utilized to reproduce a predetermined motion.

Other and further objects of my invention will appear from the following description.

In general, my invention contemplates a method of generating synchronous signals to reproduce a predetermined motion including the steps of phase modulating a three-phase signal with a voltage varying proportionally to the motion to be reproduced such that a pair of three-phase signals result, the arrangement being such that the varying voltage causes phase displacements in the voltages of one signal of said pair of signals which are opposite to the phase displacments caused by the varying voltage in the voltages of the other of said pair of signals, adding selected voltages from the respective signals of said pair of signals and differentiating the added voltages to obtain a synchronous control output signal which will reproduce the predetermined motion when fed to the stator of a synchro-receiver. In addition I have provided apparatus including phase-modulating devices, appropriate adding circuits and differentiating circuits to carry out the above method.

In the accompanying drawings which form part of the instant specification and which are to be read in conjunction therewith and in which like reference numerals are used to indicate like parts in the various views:

Figure 1 is a schematic view showing a block diagram of the arrangement of the elements of my apparatus for generating synchronous control signals and capable of carrying out my method.

Figure 2 is a schematic view of a synchro-transmitter.

Figure 3 is a diagrammatic view showing the relative positions of the rotor and stator coils of a synchro-transmitter at some particular instant.

Figure 4 is a schematic view showing one means by which a record of motion or displacement varying with time can be obtained.

Figure 5 is a curve of voltage proportional to displacement plotted against time showing the motion to be reproduced.

Figure 6 is a schematic view showing the detailed electrical circuits of my apparatus for generating synchronous control signals and capable of carrying out the method of my invention.

More particularly, referring now to the drawings, a synchro-transmitter, indicated by the reference numeral 10 has a rotor coil 12 and Y-connected stator coils 14, 16 and 18, respectively, as can be seen in Figure 2. The relative dispositions of the rotor and stator coils are diagrammatically illustrated in Figure 3. If a voltage $e = E \sin \omega' t$ is impressed on the rotor winding 12 and the rotor is displaced in accordance with some angular function of time $\theta(t)$, the resulting flux through the rotor coil can be expressed as:

(1) $$\phi_r = A \sin \omega' t$$

The flux $\phi_n$ resulting from currents induced in respective stator windings by the rotor flux can be represented by vectors which are the projections of the vector $\phi_r$ on normals to the planes of the stator coils and may be expressed by the equation:

(2) $$\phi_r = \phi_r \cos[\theta t) + n120°] = A \sin \omega' t \cos [\theta(t) + n120°]$$

where $n = 0, +1, -1$. The voltage induced in each of the stator coils, which voltages make up the output signal of the synchro-transmitter, can be expressed by the equation:

(3) $$e_n = K_1 \frac{d}{dt} \phi_n = K_1 \frac{d}{dt} \{ A \sin \omega' t \cos [\theta(t) + n120°] \}$$

Carrying out the indicated operation:

(4) $$e_n = K_2 \left\{ \omega' \cos \omega' t \cos [\theta(t) + n120°] - \frac{d\theta(t)}{dt} \sin \omega' t \sin [\theta(t) + n120°] \right\}$$

Therefore, if we are to reproduce a motion which varies as $\theta(t)$, we must produce a signal which is expressed by Equation 4.

A record of a motion in which displacement varies as a function of time can be obtained by any appropriate means, one example of which is illustrated in Figure 4. A shaft 20 having an annular rotation proportional to $\theta(t)$ drives the brush 22 of a potentiometer 24 through any appropriate linkage 26. Current is supplied to potentiometer 24 by suitable means such as a battery 28. Brush 22 picks a voltage off potentiometer 24 which varies proportionally to the variation in angular displacement of shaft 20 with respect to time. This varying voltage could be plotted against time and would result, for example, in a curve such as is shown in Figure 5. This voltage is fed to the coil 30 of a magnetic recorder and makes a record of the voltage on the tape 32 of the recorder. The tap 32 is driven past the coil 30 by a constant speed motor 34 rotating at a known speed. When the tape is played back at the same speed adjacent to a pickup head, the first derivative of the signal on the tape will be produced. When this signal is passed through an integrating channel, it will reproduce the voltage fed to coil 30, which voltage is proportional to the variations in the motion which varies as $\theta(t)$. Thus, we can record a voltage proportional to the motion and reproduce this voltage at a later time and in a place far removed from the source of motion.

As can be seen by reference to Figure 1, my apparatus for generating synchronous control signals includes a plurality of phase-modulating devices 36, 38, 40, 42, 44 and 46, one group of terminals 48, 50 and 52 of each of which is connected acros a three-phase source of supply indicated by reference character 54. These connections are made in the order shown in Figure 1. The modulating voltage input terminals 56 and 58 of each of the phase-modulating devices are connected in series across a source of modulating potential indicated by reference characters 60 and 61. I have shown the modulating potential applied in series in Figure 1. It is to be understood that the modulating potential may be impressed in parallel as shown in Figure 6, which is the preferred connection. A pair of output terminals 62 of the phase-modulating devices is connected, respectively, to one of three voltage adders 64, 66 and 68, in a predetermined manner as shown in Figures 1 and 6. The output of each of the adders is fed to an associated differentiator 70, 72 and 74, respectively, and the differentiator outputs appear across the terminals 76, 78 and 80, respectively, and ground as can readily be seen by reference to Figure 6 in which the detailed electrical circuits of the block diagram of Figure 1 are shown.

For the phase-modulating devices I have chosen phasitron tubes of the type described in the "Electronic Tube Engineering Bulletin," August 1, 1947, published by the Electronics Department of the General Electric Company, Schenectady, New York. Each of the phasitron tubes is made up of a heater 82, a cathode 84, a pair of focus electrodes 86 and 88, deflector grid elements 90, a neutral plane 92 and a first and second plate 94 and 95. The phasitron tubes are connected across the three-phase source 54 in the manner shown in Figure 1. A resistance network 96 between a source of positive potential 98 and ground supplies the bias for all the second focus electrodes 88 and the neutral planes 92. The bias for the first focus electrode 86 is supplied from a resistor 100 connected to a source of positive potential 102. Source 102 also supplies the plate voltage for each of the plates 95 through resistors 104 and the voltage for paltes 94 through networks 106. As can be seen by reference to Figure 6, the deflectors 90 are connected across the sources of three-phase supply 54 in the order illustrated in Figure 1. The output signal distortion of any phasitron tube is a function of the element control voltages, and if small output signal distortion is desired, separate controls are advisable. Therefore, we have provided a control 108 for all the second focus electrodes 88 of the tubes, a control 109 for the neutral planes 92 and separate controls 110 for the respective first focus electrodes 86 of the tubes. A low potential alternating current source 111 supplies the voltage for heaters 82.

Each of the phasitron tubes is provided with a modulating coil 112 on which the modulating signal is impressed from terminals 60 and 61. These coils may be connected in series as shown in Figure 1 if desired, but for increased sensitivity they are preferably connected in parallel in the manner shown in Figure 6 and provided with resistance attenuators 114 which allow equal phase deflections to be obtained from all tubes for a given input voltage. Resistors 116 are connected in series with the attenuators and chosen to keep the total load resistance the same as it would be with a series coil arrangement.

The outputs of the respective phasitrons are each fed to the input terminals of respective ones of the adding circuits 64, 66 and 68. Each of the adding circuits includes a pair of input resistors 118 and 120, an amplifier 122 and a resistor 124 across the amplifier. Each of the added outputs in turn is fed to one of the differentiators 70, 72, and 74, respectively. The differentiators each include a capacitor 125, an amplifier 126 and a resistor 128 connected across the amplifier. The differentiator outputs appear between the terminals 76, 78 and 80, respectively, and ground 81.

In use, the phase-modulating devices are connected across the three-phase supply 54 in the manner shown in Figure 1 and a voltage proportional to the motion to be reproduced impressed on the modulator input terminals 60 and 61 of each of the devices. The three-phase supply voltage can be represented by the equation:

(5) $\qquad e_s = K_3 \sin (\omega t + n 120°)$ where $n = 0, +1, -1$. The outputs of the phasitron tubes will be phase modulated voltages which may be generally represented by:

(6) $\qquad e_p = K_4 \sin (\omega t + \alpha \pm \theta(t) + n 120°)$ where $\alpha$ is an arbitrary angle of the phasitron system and $\theta(t)$ is the modulating voltage. Equation 6 can also be considered to represent a pair of oppositely modulated three-phase signals, depending on whether $\theta(t)$ is positive or negative. In my arrangement the outputs of the phasitron tubes are connected to the respective adders in the following order: Phasitrons 40 and 46 to adder 64; phasitrons 44 and 42 to adder 66; phasitrons 36 and 38 to adder 68. Each of the adders 64, 66 and 68 is connected, respectively, to one of the differentiators 70, 72 and 74. If we can represent the respective outputs of phasitron tubes 36, 40, 44, 38, 42 and 46 by $e_{11}$, $e_{12}$, $e_{13}$, $e_{21}$, $e_{22}$ and $e_{23}$, respectively, the signals from differentiators 70, 72 and 74 will be, respectively:

(7) $\qquad e_{01} = \dfrac{d}{dt}(e_{12} + e_{23})$ (8) $\qquad e_{02} = \dfrac{d}{dt}(e_{13} + e_{22})$ (9) $\qquad e_{03} = \dfrac{d}{dt}(e_{11} + e_{21})$ Substituting values and simplifying:

(10) $\qquad e_{01} = 2K_5 \dfrac{d}{dt}\{\sin (\omega t + \alpha) \cos [\theta(t) - 120°]\}$

(11) $\qquad e_{02} = 2K_5 \dfrac{d}{dt}\{\sin (\omega t + \alpha) \cos [\theta(t) + 120°]\}$

(12) $\qquad e_{03} = 2K_5 \dfrac{d}{dt}\{\sin (\omega t + \alpha) \cos [\theta(t)]\}$ Carrying out the indicated differentiations:

(13)

$e_{01} = 2K_5 \left\{ \omega \cos(\omega t + \alpha) \cos [\theta(t) - 120°] - \dfrac{d\theta(t)}{dt} \sin (\omega t + \alpha) \sin [\theta(t) - 120°] \right\}$

(14)
$$e_{02}=2K_5\left\{\omega \cos(\omega t+\alpha) \cos[\theta(t)+120°] - \frac{d\theta(t)}{dt} \sin(\omega t+\alpha) \sin[\theta(t)+120°]\right\}$$

(15)
$$e_{03}=2K_5\left\{\omega \cos(\omega t+\alpha) \cos[\theta(t)] - \frac{d\theta(t)}{dt} \sin(\omega t+\alpha) \sin[\theta(t)]\right\}$$

Or the output signal can generally be represented:

(16)
$$e_0=2K_5\left\{\omega \cos(\omega t+\alpha) \cos[\theta(t)+n120°] - \frac{d\theta(t)}{dt} \sin(\omega t+\alpha) \sin[\theta(t)+n120°]\right\}$$

where $n=0, +1, -1$. This compares with the expression of Equation 4 representing the output voltages of a synchro-transmitter, if $2K_5=K_2$ and $\omega'1=\omega 1+\alpha$. Since $\omega'$ can be selected to equal $\omega$ and the only difference between the equations is in the constants, their relationships can be made identical by proper selection of circuit constants. Therefore, if any record is available from which a voltage proportional to the motion can be produced, I can reproduce the motion itself with my method and apparatus. This is done by impressing the signal on the stator of the output synchro whose rotor is energized by a single-phase voltage of the frequency of the control signal.

It will be seen that I have accomplished the objects of my invention. I have provided a method for generating a synchronous control signal from a voltage which varies as an aperiodic motion to be reproduced, which control signal is identical with the signal which would be produced by a synchro-transmitter if its rotor were displaced according to the motion to be reproduced. With my method I can reproduce a motion which varies irregularly with time at a point far removed in time and space from the point at which the motion initially occurred. In addition I have provided one example of the type of apparatus which may be employed to cary out the method of my invention.

It will be understood that certain features and sub-combinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. Apparatus for producing a synchronous control signal from a varying voltage including in combination a three-phase signal source, a plurality of phase-modulating means for modulating said three-phase signal in accordance with said varying voltage to produce a pair of oppositely modulated three-phase signals, means for adding each of the component voltages of one of said pair of three-phase signals with a respective selected component voltage of the other of said pair of three-phase signals to obtain three sum voltages and differentiators for differentiating the sum voltages to produce the desired synchronous control signal.

2. Apparatus as in claim 1 wherein said phase-modulating means are phasitron tubes.

3. Apparatus as in claim 1 wherein said plurality of phase-modulating means include a pair of groups of three phasitron tubes each and said means for adding includes three voltage adding networks, the outputs of the first phasitron of each of said pair of groups being fed to the third of said adding networks, the outputs of the third phasitron of the first of said pair of groups and of the second phasitron of the second of said pair of groups being fed to the second of said adding networks and the outputs of the second phasitron of the first of said pair of groups and of the third phasitron of the second of said pair of groups being fed to the first adding network.

4. Apparatus as in claim 1 wherein said plurality of phase-modulating means include a pair of groups of three phasitron tubes each, each of said phasitron tubes including a modulating coil and a trio of grid deflector elements, the voltages of said three-phase signal source being impressed on the deflector elements of each of said phasitron tubes in predetermined order, said varying voltage being impressed on the modulating coil of each of said phasitron tubes.

5. Apparatus as in claim 1 wherein each of said phase-modulating means includes a phasitron tube having a modulating coil and an attenuating network associated with each of said modulating coils, said modulating coils being connected in parallel.

6. Apparatus as in claim 1 wherein said phase-modulating means are phasitron tubes including first focus electrodes and a separate control for each of said first focus electrodes.

7. A method of producing a synchronous control signal from a varying voltage including the steps of phase-modulating a three-phase signal with said varying voltage to produce a pair of oppositely modulated three-phase signals, adding selected component voltages from respective oppositely modulated three-phase signals to produce sum voltages and differentiating said added voltages to produce said synchronous control signal.

8. A method of producing a synchronous control signal representing an aperiodic motion including the steps of producing a voltage record of said aperiodic motion, phase-modulating a three-phase signal with a voltage agreeable to said record to produce a pair of oppositely modulated three-phase signals, adding selected component voltages from respective oppositely modulated three-phase signals to produce sum voltages and differentiating the sum voltages to obtain an output signal which is a synchronous control signal capable of reproducing said aperiodic motion when fed to the stator of a synchro-receiver.

References Cited in the file of this patent

UNITED STATES PATENTS

| 1,769,018 | Duncan, Jr. | July 1, 1930 |
| 2,475,245 | Leaver et al. | July 5, 1949 |
| 2,537,770 | Livingston et al. | Jan. 9, 1951 |